T. H. MAURSETH.
CLUTCH FEEDING MECHANISM.
APPLICATION FILED DEC. 17, 1914.

1,170,085.

Patented Feb. 1, 1916.

WITNESSES.

INVENTOR.
Thorsten H Maurseth
By Henry L. Reynolds
his attorney.

UNITED STATES PATENT OFFICE.

THORSTEN H. MAURSETH, OF SEATTLE, WASHINGTON, ASSIGNOR OF ONE-HALF TO LOUIS BEIRL, OF SEATTLE, WASHINGTON.

CLUTCH FEEDING MECHANISM.

1,170,085.  Specification of Letters Patent.  Patented Feb. 1, 1916.

Application filed December 17, 1914. Serial No. 877,804.

*To all whom it may concern:*

Be it known that I, THORSTEN H. MAURSETH, a citizen of the United States, and resident of Seattle, King county, Washington, have invented certain new and useful Improvements in Clutch Feeding Mechanisms, of which the following is a specification.

My invention relates to clutch mechanisms for intermittent feeding. It is more particularly designed for the intermittent movement of rotative members by turning them through small distances at a time. The particular kinds of mechanisms upon which it may be applied are various.

The object of my invention is to produce a means for intermittently rotating shafts, wheels and like parts, through successive small and like distances, by mechanisms which are simple, effective and reliable.

My invention comprises the special features and parts and combinations thereof which will be herein described and particularly pointed out in the claims which terminate this specification.

In the accompanying drawings I have shown my invention applied to the intermittent rotation of a shaft by successive small amounts, the construction illustrated being that which is now preferred by me for this particular kind of application.

Figure 1:
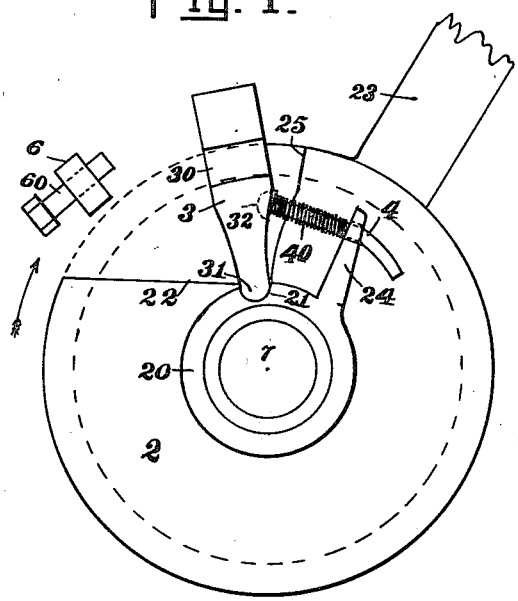
Figure 2:
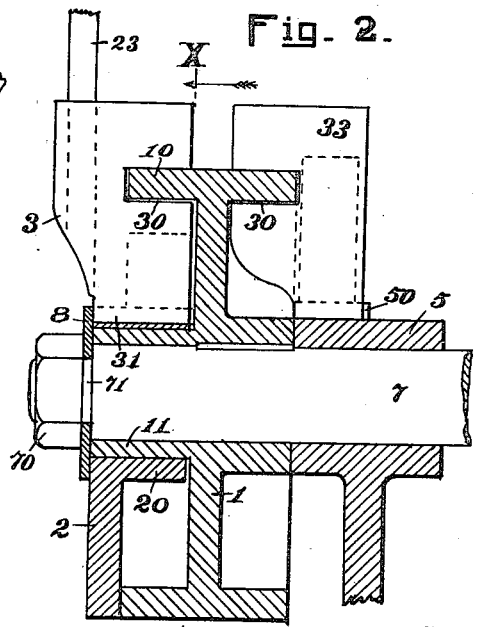
Figure 3:
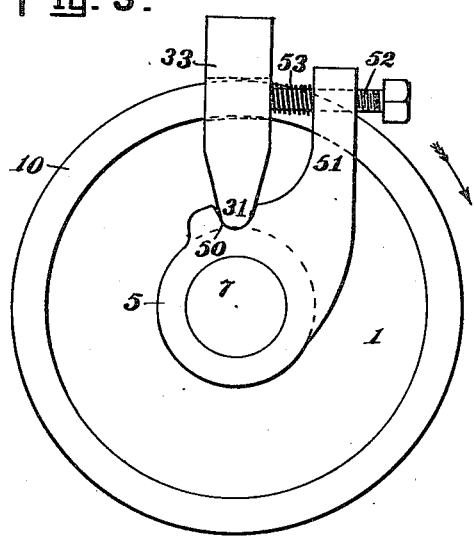
Figure 4:
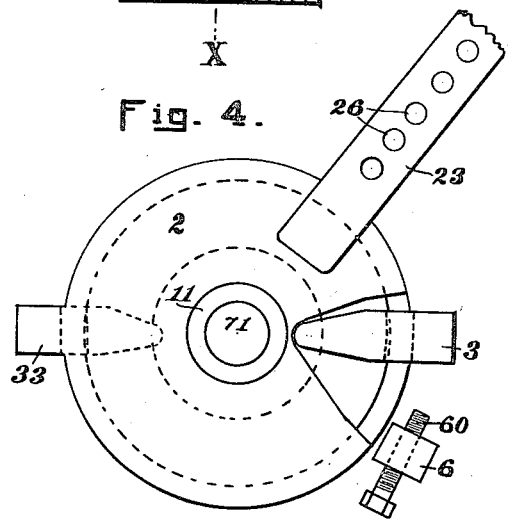

Figure 1 is an inner face view of the member which carries the clutching member and through which the rotative impulse is communicated, the view showing the inner face thereof. Fig. 2 is a section lengthwise the axis of the mechanism employed. Fig. 3 is an outer face view of the clutch-engaging wheel and a clutch member employed as a stop to prevent backward movement of the driven member. Fig. 4 is an outer face view of parts such as are shown in Fig. 1, but with a slightly different arrangement thereof.

My invention, as I have herein shown it, is applied to the intermittent rotation, by small amounts, of a shaft. Such applications would comprise the great proportion of cases where it would be employed, but it might be employed for other uses.

When applied to rotate a shaft, as the shaft 7, the shaft should have secured thereto, a member carrying a flange, the surfaces of which are surfaces of revolution having the axis of the shaft as their axis. Such member, as shown, consists of the wheel 1, the rim 10 serving as the flanges referred to.

The clutch or gripping member, consists of a block 3, or an equivalent member, which is provided with a transverse notch 30, which spans the flange 10. This notch is of sufficient width as to fit loosely, to thereby permit free and unrestrained movement between the flange and the clutch member, so long as they are maintained in proper angular positions relative to each other.

Where my device is used for driving or turning a shaft, one end of the clutch block is supported by a rotative member which is mounted to oscillate or turn and which acts as the driving member. Such driving member, as herein shown, consists of the disk 2, which is provided with a hub 20, which turns upon the hub 11 of wheel 1. The hub 20 has a groove or slot 21, extending parallel its axis, into which groove fits the inner end, 31, of the clutch block 3.

For successful operation of my device, the clutch block should be continuously acted upon to gently move it in a backward direction, or in the direction opposite that in which it is desired to turn the driven member, thus causing it to be moved into reengaging position upon the backward movement of the driving member. This backward movement of the clutch member may be produced by gravity, if its position is properly chosen, or as shown in Fig. 4; or by a spring, as is shown in Figs. 1 and 3. The spring 40, as shown, surrounds a pin 4, the head of which rests in a recess 32 in a side face of the clutch block 3, and the body of which passes through a guide hole in an arm 24, which is connected with or forms a part of the disk 2, or the driving member.

I have shown a handle or arm, 23, connected with the disk 2, by which it may be oscillated. This is intended only to represent the means for actuating the disk, which means, in practice, may be quite different from such arm. The disk is also shown as provided with a notch 22, within which is the clutch block 3. A washer 8, secured in place on the end of the shaft 7 by nut 70, or any other suitable means, secures the block 3 in place, by overlapping slightly its inner end.

In use, the disk 2, or the driving member, would be oscillated, the clutch block 3 sliding freely back with the backward movement of the disk. When the disk is moved forward, or in the direction of feed, the clutch block will grip the inner and outer surfaces of the flange 10, by the corners of the groove therein, so as to move the flange forward with it. The width of the groove 30 should be such as to cause looseness enough so that the clutch block will rock slightly, as it will thereby grip the flange more securely than if it fitted closely.

The same type of clutch block may be used to prevent backward movement of the flanged member 1. Such application is shown in Figs. 3 and 4. The dog 33 has its end 31, supported in a recess 50 in a bearing or fixed frame member 5, and is held in engaging position by a spring 53, which surrounds an adjusting screw 52, which is threaded in a fixed arm 51. In Fig. 4 the same mechanisms are shown, these acting as described, except that the clutch dogs have been placed in such position that gravity acts to move them backward, or into reëngaging position, instead of having to rely upon springs for this purpose.

In some places and for certain uses, it might be desirable to prevent backward movement of the operating handle 23, beyond a definite point, in case the shaft were given a strong backward impulse. As an instance where this might be desirable, the engine shaft of an automobile or other internal explosion engine, started by hand cranking, is given. To provide for this, it is only necessary to place a stop in such position that the dog will engage it on the backward movement upon reaching a certain point therein, and in such way as to release the grip of the clutch block upon the flange. Such a stop is represented by the arm 6 which is placed in the path of backward travel of the outer end of the clutch block. The exact point of engagement may be made adjustable, as by using a threaded bolt 60, as the contacting member. The same construction will operate as a means of accurate adjustment of the amount of feed given at each oscillation. This is done by limiting the backward movement of the block, thereby also limiting the time when it will engage on the forward movement, to such time as the overtravel given the disk has all been taken up. An adjustment of the extent of feed may also be secured by adjusting the distance from the center at which the power connection is made with the lever 23. I have shown this as provided with a series of holes 26 for this purpose. Any other method of adjustment may be employed.

What I claim and desire to secure by Letters Patent is:

1. An intermittent feed device comprising a driven member having an axially projecting flange which is concentric with its rotative axis, a driving member pivoted concentric with and comprising a disk adapted to largely close the space inclosed by the said flange, said driving member having a hub concentric with the flange and provided with an axially extending peripheral groove, a feed dog having a transverse slot spanning the flange and its inner end entering the groove in said hub, the disk having a segment cut away to permit insertion and removal of the dog without disturbing the other parts, and a securing member adapted to be secured to the driven member and engaging outwardly facing surfaces of the driving member and the dog to retain the whole in place.

2. An intermittent feed device comprising a wheel-like driven member having peripheral, axially-projecting flanges and a central hub, a driving member comprising a disk having a hub pivoted upon the hub of the driven member and a sector cut away and extending from its hub outward, said hub of the driving member having an axially extending peripheral groove extending to the outer face of the disk within said cut away sector, a feed dog having a transverse slot spanning the flange of the driven member and its inner end entering the groove in the hub of the driving member, a spring connecting said dog and the driving member and acting to throw the dog toward one side of said cut away sector, a disk and means for securing it to the driven member and engaging the driving member and feed dog to prevent their separation from the driven member.

3. An intermittent feed device comprising a wheel-like driven member having peripheral axially-projecting flanges and a central hub, a driving member comprising a disk having a hub pivoted upon the hub of the driven member and a sector cut away and extending from its hub outward, said hub of the driving member having an axially-extending peripheral groove extending to the outer face of the disk within said cut away sector, a feed dog having a transverse slot spanning the flange of the driven member and its inner end entering the groove in the hub of the driving member, a spring connecting said dog and the driving member and acting to throw the dog toward one side of said cut away sector, and means for locking said parts together to prevent separation.

4. An intermittent feed device comprising a wheel-like driven member having peripheral axially-projecting flanges and a central hub, a driving member comprising a disk having a hub pivoted upon the hub of the driven member and a sector cut away and extending from its hub outward, said hub of the driving member having an axially-extending peripheral groove extending to the outer face of the disk within said cut away sector, a feed dog having a transverse slot spanning the flange of the driven member and its inner end entering the groove in the hub of the driving member, the driving member having a lug projecting toward the driven member adjacent the cut away sector and having a hole therethrough alined with the feed dog, the feed dog having a recess alined with said hole, a headed bolt having its stem passed through the hole in the lug and its head entering the recess in the dog, and a coiled spring surrounding said bolt between lug and dog and acting under compression to hold the dog over toward one side of the cut away sector of the driving member.

5. An intermittent feed device comprising a wheel-like driven member having peripheral axially-projecting flanges and a central hub, a driving member comprising a disk having a hub pivoted upon the hub of the driven member and a sector cut away and extending from its hub outward, said hub of the driving member having an axially-extending peripheral groove extending to the outer face of the disk within said cut away sector, a feed dog having a transverse slot spanning the flange of the driven member and its inner end entering the groove in the hub of the driving member, the driving member having a lug projecting toward the driven member adjacent one edge of the cut away sector, a spring connecting said lug and the dog to hold the dog yieldingly toward one side of said cut away sector, and a locking disk and means for securing it to the driven member and overlapping the driving member and the inner end of the dog to prevent the separation of said parts.

6. An intermittent feed device comprising a driven member having an axially-projecting circular flange, a driving member comprising a disk fitting against the edge face of said flange and having a sector cut away, said disk being pivoted concentric said flange and having a side projection extending toward the driven member between its pivot and said flange, said projection having an axially-extending groove facing toward said flange and lying within said cut away sector, a feed dog having a transverse slot spanning said flange and its inner end entering said groove, and means for preventing axial separation of said parts.

In testimony whereof I have hereunto affixed my signature this 10th day of December, 1914.

THORSTEN H. MAURSETH.

Witnesses:
  HENRY L. REYNOLDS,
  CHARLES L. REYNOLDS.